United States Patent [19]

Koch

[11] Patent Number: 5,478,549
[45] Date of Patent: Dec. 26, 1995

[54] PRODUCTION OF NITRIC OXIDE

[75] Inventor: Theodore A. Koch, Wilmington, Del.

[73] Assignee: E. I. Du Pont de Nemours and Company, Wilmington, Del.

[21] Appl. No.: 356,757

[22] Filed: Dec. 15, 1994

[51] Int. Cl.$^6$ .................................................. C01B 21/26
[52] U.S. Cl. ........................................ 423/403; 423/351
[58] Field of Search ....................................... 423/403, 351

[56] References Cited

U.S. PATENT DOCUMENTS

| | | | |
|---|---|---|---|
| 3,947,554 | 3/1976 | Senes et al. | 423/403 |
| 4,774,069 | 9/1988 | Handley | 423/403 |
| 5,314,673 | 5/1994 | Anseth et al. | 423/351 |

*Primary Examiner*—Wayne Langel

[57] ABSTRACT

A process for the manufacture of nitric oxide by the Ostwald process where group VIII metal is recovered in a catchment trap, and the nitrous oxide is converted to nitrogen and oxygen by passing it through a bed of zirconium oxide at reaction temperature.

8 Claims, No Drawings

PRODUCTION OF NITRIC OXIDE

FIELD OF THE INVENTION

This invention relates to the production of nitric oxide by the oxidation of ammonia over a platinum group metal catalyst at a temperature above about 800 degrees C. During such a process most of the ammonia is oxidized to NO, but some $N_2O$ (nitrous oxide) is also formed. This invention provides a method of destroying the nitrous oxide and thus avoiding the release of nitrous oxide to the atmosphere.

BACKGROUND OF THE INVENTION

A well-known industrial process for the production of nitric acid is known as the Ostwald process. This process involves the oxidation of ammonia with oxygen over a platinum group catalyst, often platinum or a platinum/rhodium alloy, at a temperature above about 800 degrees C, sometimes as high as 1200 degrees C. The resulting gas stream contains nitric oxide, NO, and nitrous oxide, $N_2O$. (See Ind. Eng. Chem. Proc. Dev., 1962, 21, 73–79.) The NO is cooled in the presence of excess oxygen and $NO_2$ is formed. The $NO_2$ is reacted with water to form nitric acid. The $N_2O$ does not readily react further, and in some process is released to the atmosphere. $N_2O$ has recently been recognized as an ozone depletion gas and efforts are under way to reduce the amount of $N_2O$ that is released to the atmosphere.

Handley U.S. Pat. Nos. 4,774,069 and 4,869,891 disclose process is for the production of NO by the oxidation of ammonia over a platinum group catalyst. Patent '069 points out that during the oxidation some platinum and rhodium are converted to oxides and the oxides are vaporized and unless captured are lost. In the '069 process, a catchment trap is installed subsequent to the oxidation chamber where the vaporized catalyst metal oxides are deposited and subsequently recovered.

Anseth et al. U.S. Pat. No. 5,314,673 discloses conversion of $N_2O$ to nitrogen and oxygen by contacting the $N_2O$ with a catalyst consisting essentially of nickel oxide and cobalt oxide on a zirconia substrate.

SUMMARY OF THE INVENTION

The present invention is a process for the manufacture of nitric oxide by oxidizing ammonia in which the amount of nitrous oxide, i.e., $N_2O$, by-product is lowered, which comprises passing a gas stream containing ammonia and oxygen in contact with a catalyst containing platinum group metal under conditions such that nitric oxide and nitrous oxide will be formed in the stream, then passing the stream in contact with a catchment trap where platinum group metal oxides that were volatilized during the prior step are recovered, and then dispersing the stream through a bed containing zirconium oxide where the steam is contacted with the zirconium oxide, and the nitrous oxide is converted to nitrogen and oxygen. The process is preferably carried out where the temperature of the bed containing zirconium oxide is at or above 600 degrees C. Preferably, the bed consists essentially of zirconium oxide. A suitable form of zirconium oxide is pellets that are cylinders having a diameter of approximately ⅛ inch and a length of approximately ⅛ inch. Preferably, the platinum group catalyst contains platinum and at least one other Group VIII metal selected from the group of rhodium and palladium. The catchment trap preferably contains palladium components. It is desirable to heat the gas stream containing ammonia and oxygen to at least approximately 270 degrees C before contacting the platinum group catalyst. The zirconium oxide may be coated on an inert substrate such as alumina, silica boria, magnesia, or titania. Sometimes it is desirable to stabilize the zirconium oxide with small amounts, stabilizing amounts, of calcium and/or yttrium.

DETAILED DESCRIPTION

The platinum group metal catalyst may be in the form of a wire screen. An alloy of 90% by weight platinum and 10% by weight rhodium is highly satisfactory. Also, an alloy of 90% by weight platinum and 5% by weight rhodium and 5% by weight palladium is satisfactory.

Catchment traps of the type disclosed in Handley U.S. Pat. No. 4,774,069 are satisfactory for use in the process of the present invention. The Handley patents are incorporated by reference.

A satisfactory bed of zirconium oxide (ZrO2) is one comprising ⅛"×⅛" cylindrical tablets. Other forms of zirconium oxide having a relatively high surface area may also be employed, for example, zirconium oxide woven mesh, and honeycombs shaped structures of zirconium oxide.

The volume of the zirconium oxide bed is, of course, related to the volume of gas that is to be passed through the bed. At standard conditions of temperature and pressure, the bed volume should be such that about 30,000 bed volumes of gas will pass through the bed in one hour, i.e., 30,000 volumes at STP/hr.: a range of 20,000 bed volumes to 40,000 bed volumes per hour is the usual operating range.

The bed temperature should be above about 600 degrees C for most efficient operation, about 800 to 1000 degrees C is often preferred.

Since the reaction of nitrous oxide in the bed forms nitrogen and oxygen, the thus formed oxygen is available to oxidize NO to $NO_2$. (The oxygen for this step in the preparation of nitric acid is traditionally supplied by air. Using the process of the invention less air is needed so there is less dilution of the stream with nitrogen.)

EXAMPLE

A catalyst pack is assembled in tandem with a catchment trap of the type shown in the drawings of U.S. Pat. No. 4,774,069. The catalyst pack will consist of four layers of woven platinum/rhodium wire made from an alloy of platinum with 10 wt. % (based on the weight of alloy) of rhodium. All layers of the catalyst pack are to be made from wire of diameter of 0.076 mm woven into a gauze of mesh size 1024 interstices per sq. cm. which will give the cloth an open area of 57%.

The catchment trap will consist of three layers of interstitial ceramics cloth interleaved with two layer of palladium scavenger-wire. The ceramics cloth will consist of a ceramics material composed of 62 wt. % alumina, 24 wt. % silica and 14 wt. % boria formed into fibers of diameter 11 mum which, in turn, will be spin into threads and woven to make a cloth of mesh size 50 interstices per sq. cm. which will give the cloth an open area of 52.6%.

The palladium layers will consist of palladium wire of diameter 0.080 mm woven into a gauze of mesh size 1024 interstices per sq. cm., giving an open area of 55%. The catchment pack will be wrapped in heat-resistant woven metal gauze.

Below the catchment trap will be located a bed of zirconium oxide cylindrical pellets having a length of about 1/8" and a diameter of about 1/8". The bed depth will be adjusted to give a space velocity such that 30,000 bed volumes of gas can pass through it at standard conditions of pressure and temperature in one hour.

A reactant mixture consisting of air containing 10 volume % ammonia will be passed through the assembly at a pressure of 4 bar. The reactant mixture will be heated to 270 degrees C before entry into the catalyst pack.

The temperature of the bed of zirconium oxide will be higher than 600 degrees C.

When operating in the manner outlined above, the product gas stream will have a high concentration of NO and a very low concentration of $N_2O$.

What is claimed is

1. A process for the manufacture of nitric oxide by oxidizing ammonia in which the amount of nitrous oxide, i.e., $N_2O$ by-product is lowered, which comprises passing a gas stream containing ammonia and oxygen in contact with a catalyst containing a platinum group metal under conditions such that nitric oxide and nitrous oxide will be formed in the stream, then passing the stream in contact with a catchment trap where the platinum group metal oxide that was volatilized during the prior step is recovered, and then dispersing the stream through a bed consisting essentially of zirconium oxide where the stream contacts zirconium oxide and nitrous oxide in the stream is converted to nitrogen and oxygen.

2. The process of claim 1 in which the temperature of the bed consisting essentially of zirconium oxide is at or above 600 degrees C.

3. The process of claim 1 in which the bed consists essentially of zirconium oxide pellets that are cylinders having a diameter of approximately 1/8 inch and a length of approximately 1/8 inch.

4. The process of claim 1 in which the catalyst contains platinum and also contains at least one other Group VIII metal selected from the group consisting of rhodium and palladium.

5. The process of claim 1 in which the catchment trap contains palladium components.

6. The process of claim 1 in which the gas stream containing ammonia and oxygen is preheated to at least approximately 270 degrees C before contacting the platinum group containing catalyst.

7. A process for the manufacture of nitric oxide by oxidizing ammonia in which the amount of nitrous oxide, i.e., $N_2O$ by-product is lowered, which comprises passing a gas stream containing ammonia and oxygen in contact with a catalyst containing a platinum group metal under conditions such that nitric oxide and nitrous oxide will be formed in the stream, then passing the stream in contact with a catchment trap where the platinum group metal oxide that was volatilized during the prior step is recovered, and then dispersing the stream through a bed that consists of pellets that are an inert substrate coated with zirconium oxide where the stream contacts zirconium oxide and nitrous oxide in the stream is converted to nitrogen and oxygen.

8. The process of claim 7 in which the pellets also contain a stabilizing amount of calcium or yttrium.

* * * * *